(12) United States Patent
Casebeer, II

(10) Patent No.: US 9,021,872 B2
(45) Date of Patent: May 5, 2015

(54) SYSTEM FOR MEASURING SUSPENSION SAG

(71) Applicant: John Charles Casebeer, II, Flagstaff, AZ (US)

(72) Inventor: John Charles Casebeer, II, Flagstaff, AZ (US)

(73) Assignee: Motool, Flagstaff, AZ (US)

( * ) Notice: Subject to any disclaimer, the term of this patent is extended or adjusted under 35 U.S.C. 154(b) by 0 days.

(21) Appl. No.: 14/061,273

(22) Filed: Oct. 23, 2013

(65) Prior Publication Data
US 2015/0000390 A1    Jan. 1, 2015

Related U.S. Application Data

(60) Provisional application No. 61/840,454, filed on Jun. 27, 2013.

(51) Int. Cl.
*G01M 17/04*    (2006.01)

(52) U.S. Cl.
CPC .................... *G01M 17/04* (2013.01)

(58) Field of Classification Search
USPC ....................................... 73/117.03
See application file for complete search history.

(56) References Cited

U.S. PATENT DOCUMENTS

| | | | | |
|---|---|---|---|---|
| 4,407,073 A * | 10/1983 | Nilsson et al. | | 33/203.18 |
| 4,416,064 A * | 11/1983 | Hurst | | 33/612 |
| 4,551,847 A * | 11/1985 | Caldwell | | 377/24 |
| 4,977,524 A * | 12/1990 | Strege et al. | | 700/279 |
| 5,027,524 A | 7/1991 | Metcalf et al. | | |
| 5,369,602 A * | 11/1994 | Naas et al. | | 702/166 |
| 5,398,419 A * | 3/1995 | Schmidt et al. | | 33/203 |
| 5,586,062 A * | 12/1996 | Colarelli, III | | 700/279 |
| 6,347,462 B1 * | 2/2002 | Steinich | | 33/756 |
| 6,405,445 B1 * | 6/2002 | Ford | | 33/203.15 |
| 6,796,043 B2 * | 9/2004 | Jackson et al. | | 33/293 |
| 6,912,477 B2 * | 6/2005 | Murray | | 702/153 |
| 7,197,974 B2 * | 4/2007 | Glasson | | 92/5 R |
| 7,874,080 B1 | 1/2011 | Morales | | |
| 8,356,419 B2 * | 1/2013 | Lord | | 33/756 |
| 2009/0009360 A1 | 1/2009 | Flannigan et al. | | |
| 2010/0275456 A1 | 11/2010 | Lord | | |
| 2010/0325909 A1 | 12/2010 | Fratti | | |

FOREIGN PATENT DOCUMENTS

WO    PCT/US98/13855    5/1999

OTHER PUBLICATIONS

Choulouilidou, Chrissanthi, "PCT Search Report", filed Dec. 2, 2013, mailing date Mar. 3, 2014, The Netherlands.
Kokkonen, Jukka, "Written Opinion of the International Searching Authority", filed Dec. 2, 2013, mailing date Mar. 3, 2014, Munich Germany.
Casebeer, John Charles II, "Motool Slacker Digital Sag Scale", Jul. 24, 2013, retrieved from Internet: www.facebook.com/motool.com.

* cited by examiner

*Primary Examiner* — Freddie Kirkland, III
(74) *Attorney, Agent, or Firm* — Woods Ovlatt Gilman LLP; Ronald J. Kisicki, Esq.

(57) ABSTRACT

A system for measuring suspension sag in a vehicle, such as a motorcycle, is disclosed. The system includes a measuring device that attaches to a wheel hub, axle, or other component. The system includes a clamp that attaches to a fender or other vehicle component. The device is connected to the clamp by a cord, which extends from and retracts into the device. When a load is placed on the vehicle, the fender may move closer to the hub or axle. Any slack in the cord may be taken up by a spool shaft in the device. A rotary encoder may measure the rotation of the spool shaft, and the measuring device may calculate a change in a linear distance between, for example, the fender and the axle based on the rotation of the spool shaft.

8 Claims, 3 Drawing Sheets

SYSTEM FOR MEASURING SUSPENSION SAG

CROSS-REFERENCE TO RELATED APPLICATION

This application claims the benefit of U.S. Provisional Patent Application No. 61/840,454, filed Jun. 27, 2013, which is hereby incorporated by reference in its entirety.

TECHNICAL FIELD

The present invention relates generally to devices and systems for measuring the sag of a motor vehicle suspension, e.g., on a motorcycle; more particularly to devices and systems used for measuring suspension sag that can be operated without the aid of an assistant; and most particularly to devices and systems for measuring the sag of a suspension that can be operated by a single individual while the individual maintains a proper riding position during measurement.

BACKGROUND OF THE INVENTION

When setting or calibrating the suspension of a vehicle, such as a motorcycle or all-terrain vehicle, it is most desirable to measure the amount the front and rear suspension sags while the operator is mounted on the vehicle in a normal seated position. This step is critical for proper handling under racing or competition conditions.

Traditionally, properly and accurately measuring the suspension sag requires an assistant or helper to measure the sag while the operator is seated on the vehicle in a normal riding position. A common practice for measuring suspension sag is as follows. With the vehicle at rest under its own resting weight, the assistant first measures the distance between a first point on the vehicle's wheel (i.e. a wheel hub) and a second point on the vehicle's body (i.e., a fender). Then, with the operator mounted on the vehicle in a riding position, a second measurement is taken between the two previously established points. The difference between the two measurements would be the calculated sag of the vehicle under riding conditions from which a suspension adjustment would be made to optimize vehicle handling.

However, when an assistant who can take this measurement is not available, this practice cannot be administered. Thus, other systems have been devised which at least allow for solo measurement by an operator. One system for solo measurement of suspension sag generally uses a measuring element mounted onto the vehicle. While sitting in the vehicle, the operator must set the measuring element by reaching toward the measuring device. This movement shifts the operator out of a normal riding position and results in an inaccurate measurement because of the shifted weight. To alleviate this problem, slider systems have been used that include a sliding element (having measurement gradations thereon) that is mounted within a static tube. A measuring ring is frictionally secured on the sliding element. The sliding element slides within the static tube as the weight of the operator is added to the vehicle. The measuring ring memorializes the degree of movement once the weight has been removed. Thus, the operator can read the gradation on the sliding element adjacent the measuring ring once the operator has dismounted the vehicle, to determine the amount of suspension sag. This system, however, suffers from a number of drawbacks such as general difficulty in using, inaccuracy due to the sliding element or measuring ring moving beyond its position after the operator dismounts the vehicle, user error in reading the gradation or in calculating the measured distances and the inability to check instantaneous sag while the operator is mounted on the vehicle.

What is needed in the art is a device and system for measuring the sag of a vehicle's suspension that can quickly and accurately measure sag distance when used solely by an operator without use of an assistant and precisely while the operator is seated in a normal operating position.

SUMMARY OF THE INVENTION

According to one embodiment of the present invention, a system measures a change in distance between two components of a vehicle when a load is placed on the vehicle. The system includes a measuring device and a clamp. The measuring device is configured to attach to a first component of a vehicle. The measuring device includes a housing, a cord, a spool shaft, and a rotary encoder. The spool shaft is located within the housing and is configured to extend and retract the cord. The rotary encoder is located within the housing and is configured to measure a rotation of the spool shaft and to convert the rotation to a linear travel of the cord. The clamp is configured to attach to a second component of the vehicle and to receive the cord. The measuring device is configured to determine a change in a distance between the first component and the second component when a load is placed on the vehicle. The change in distance is related to the rotation of the spool shaft measured by the rotary encoder.

BRIEF DESCRIPTION OF THE DRAWINGS

The detailed description of some embodiments of the present invention is made below with reference to the accompanying figures, wherein like numerals represent corresponding parts of the figures.

DESCRIPTION OF THE PREFERRED EMBODIMENTS

As used herein, the term "sprung mass" is the mass of the vehicle's body and other components supported by the suspension, including the mass of the rider while mounted on the vehicle. The term "unsprung mass" includes the mass of components not supported by the suspension, such as for example, axles, hubs and tires.

Figure 1:
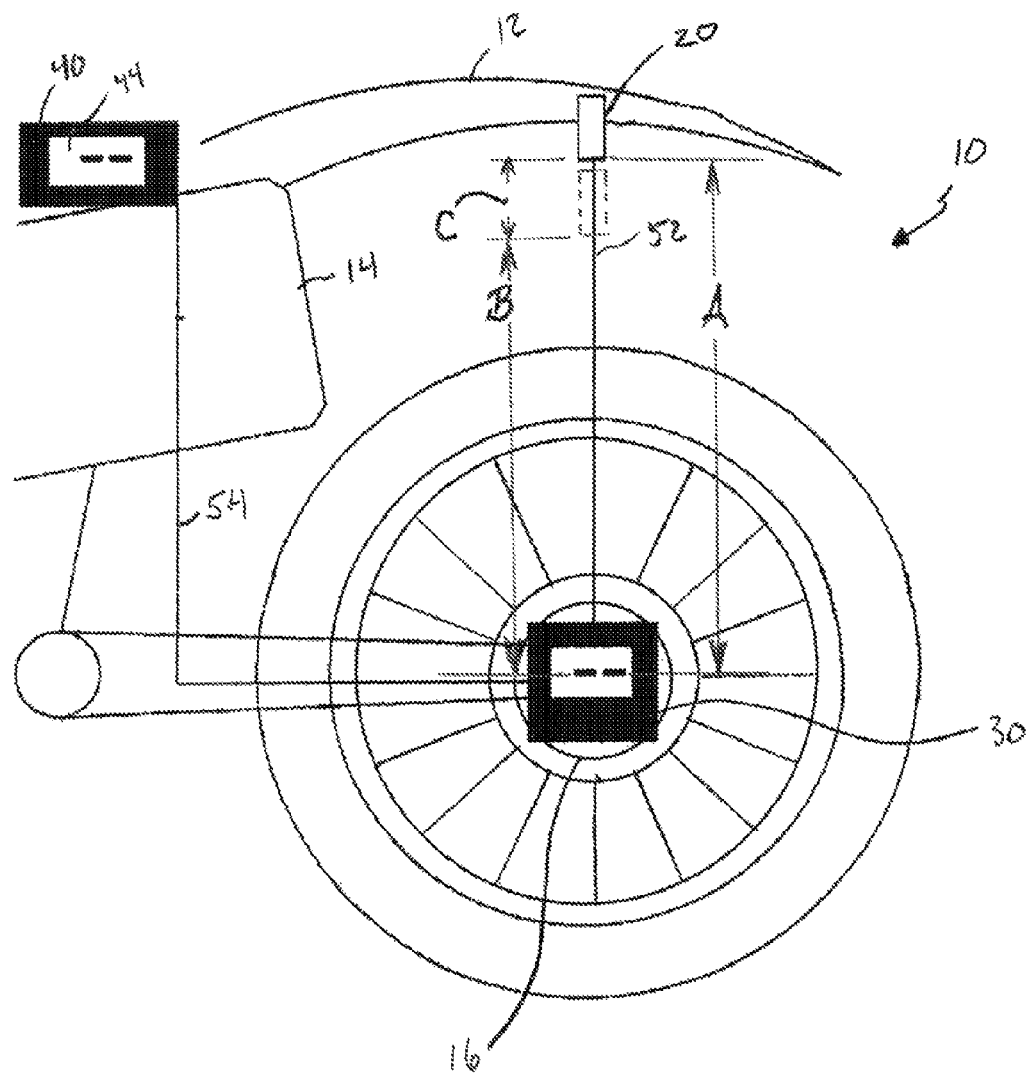
FIG. 1 shows a schematic plan view of an exemplary system for measuring suspension sag, according to an embodiment of the present invention.

Referring to FIG. 1, by way of example, the embodiment of the present invention comprises a system 10 for measuring suspension sag. The system 10 may include a clamp 20, a measuring device 30, and an optional display unit 40. The system may also include a cord 52, which may connect the measuring device 30 to the clamp 20, and an optional cable 54, which may connect the measuring device 30 to the optional display unit 40. The clamp 20 may connect to a fender 12 of a vehicle 14, such as a motorcycle, or any other component of a vehicle's body. Measuring device 30 may be mounted to a hub 16 of the front or rear wheel of the vehicle.

Figure 2:
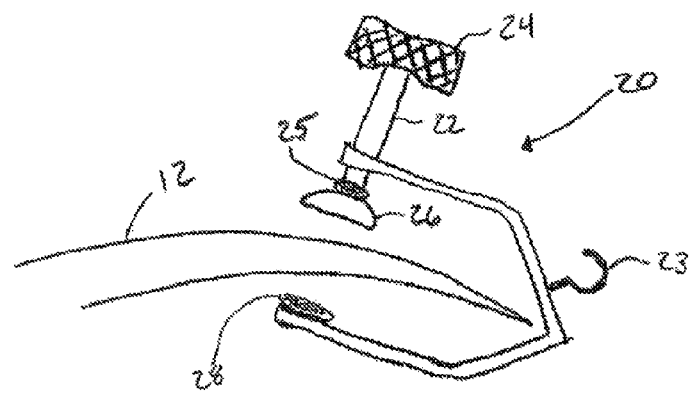
FIG. 2 shows a schematic plan view of an exemplary clamp, according to an embodiment of the present invention.

Referring to FIG. 2, the clamp 20 includes a screw 22 with a grip 24, wherein the grip 24 facilitates hand tightening of the screw 22 when mounting the clamp 20 to fender 12. The screw 22 may include a contact 26 which may be connected by a ball joint or other connector 25. The connector 25 between the contact 26 and the screw 24 allows the contact 26 to contact the fender 12 at a variety of angles. This may make the clamp 20 compatible with a large number of different fender 12 geometries, styles, constructions, and so forth. The clamp 20 may also include a contact pad 28, which may be located opposite the screw 22. The pad 28 may also facilitate compatibility between the clamp 20 and a variety of fender 12 geometries, styles, constructions, and so forth. The pad 28 and the contact 26 may include rubber, silicone, plastic, another suitable material, or any combination thereof. The pad 28 and the contact 26 are ideally selected to prevent scratching or marring of the fender surface. The clamp may include a hook 23, which may receive an eye 53 associated with the cord 52, as will be discussed in more detail with regard to FIG. 3.

Figure 3:
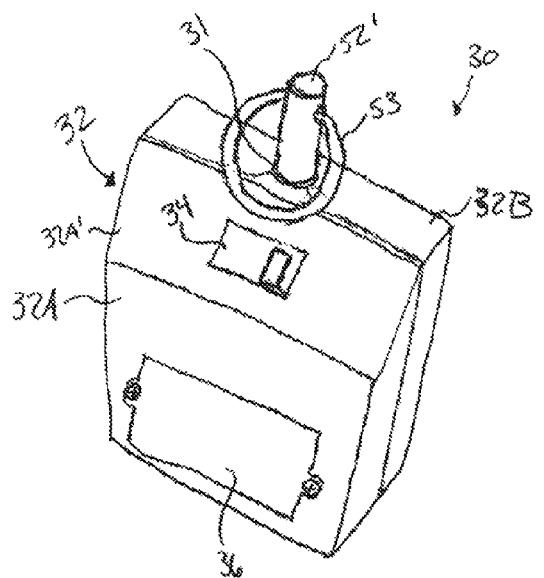
FIG. 3 is a front perspective view of a measuring device used in an exemplary system for measuring suspension sag, according to an embodiment of the present invention.
Figure 4:
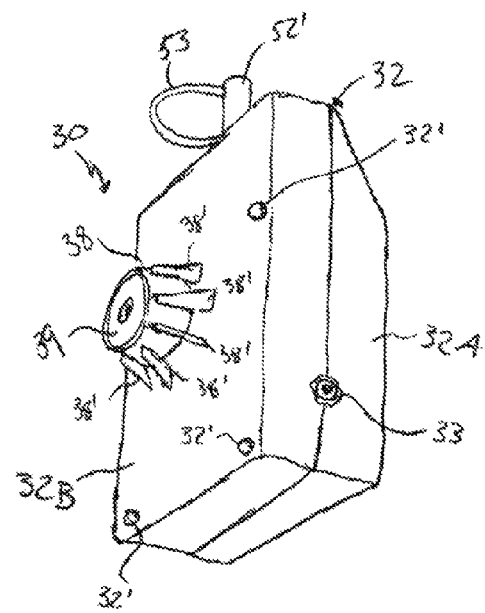
FIG. 4 is a rear perspective view of a measuring device used in an exemplary system for measuring suspension sag, according to an embodiment of the present invention.
Figure 5:
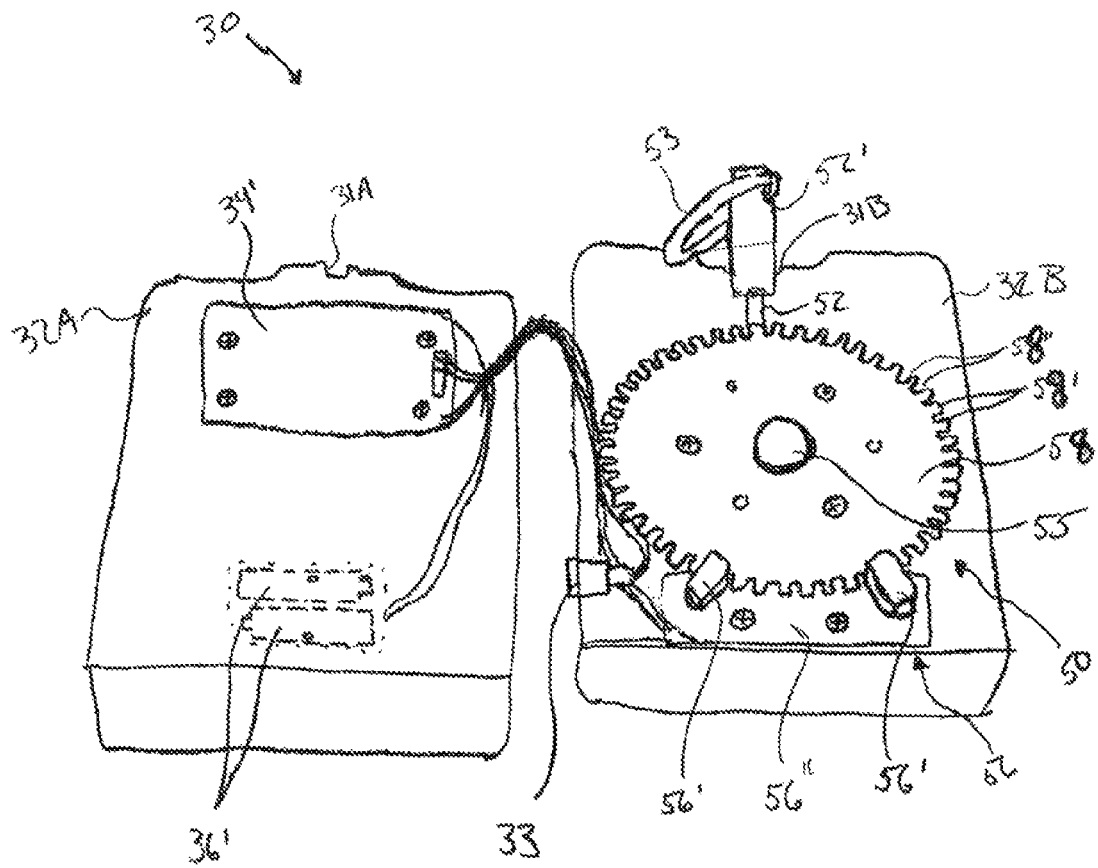
FIG. 5 show views of the internal components of a measuring device used in an exemplary system for measuring suspension sag, according to an embodiment of the present invention.

Turning now to FIGS. 3 and 4, the measuring device 30 generally comprises a housing 32 being formed by mating front housing member 32A with rear housing member 32B. In a preferred embodiment, the two housing members are releasably secured to one another by a series of screws 32'. The two housing members are also adapted to carry a through-hole 31 between them (comprised of half-holes 31A and 31B as shown in FIG. 5) through which passes cord post 52'. Mounted within cord post 52' is eye 53. Front housing member 32A is adapted to carry a screen 34 which displays measurement results upon operation of the system 10 (which will be discussed below). Front housing member 32A preferably includes a sloped portion 32A' which carries the screen 34. Sloped portion 32A' eases operator reading of the measurement displayed. In an alternative embodiment, screen 34 may be supported on a pivotal portion of front housing member 32A wherein the screen 34 may be titled tilted to any allowed preferred angle. Front housing member 32A may further include a battery box for carry one or more batteries, the box being covered by battery box cover 36. Rear housing member 32B is adapted to carry a magnet shroud 38 within which is secured magnet 39. Magnet 39 releasably mounts the measuring device 30 to hub 16 or any other suitable magnetic surface of vehicle 14. Rear housing member 32B may have a number of fins 38' integrally formed thereon in communication with the magnet shroud to increase structural integrity of the magnet shroud 38. The housing may further carry a jack 33 for an external plug, such as that associated with cable 22.

Referring to FIG. 5, the housing 32 is configured to include a measuring mechanism 50. Measuring mechanism 50 generally comprises a sprocket wheel 54 mounted onto a spool shaft 55. Sprocket wheel 54 is characterized by an outer wheel surface having a multitude of alternating teeth 54' and grooves 54". Wound about spool shaft 55 is a length of cord 52. The free end of cord 52 is equipped with a cord post 52' through which is inserted eye 53. When the cord 52 is in a non-extended position, the cord post 52' preferably rests at least partially within a through-hole (comprised of 31A and 31B) in the housing so as to minimize wear on the cord 52 and to prevent unwanted fraying or cutting of the cord when the device is being stored.

Measuring mechanism 50 further includes a rotary encoder 56 which generally comprises encoder sensors 56' mounted onto encoder printed circuit board (PCB) 56". Encoder sensors may be any suitable sensors, such as optical, mechanical, capacitive, or as in a preferred embodiment, magnetic sensors. Encoder sensors 56' measure the rotation of the spool shaft as the cord is withdrawn or retracted into the housing. Rotation of spool shaft 55 causes rotation of sprocket wheel 58. Encoder sensors 56' may for example monitor and record the number of teeth 58' or grooves 58" which pass the sensor. The number of passing teeth or grooves is indicative of the amount of rotation. This rotation measurement is then translated by the encoder PCB 56" to a linear payout or retraction of cord 52 from spool shaft 55. Encoder PCB 56" is in communication with screen 34' such that any measurement translated by the encoder PCB 56" is then displayed by screen 34. Encoder PCB 56" is further in communication with jack 33 so that the linear measurement may be displayed upon an optional auxiliary display, such as optional display unit 16 (see FIG. 1). Alternatively, encoder PCB 56" may further be equipped with a transceiver for wireless communication with a corresponding transceiver/receiver associated with an external display. This wireless communication would obviate the need for cable 54. Power for measuring mechanism 50 is supplied via batteries 36' housed with the battery box of the front housing member 32A.

In use, the system 10 may be attached to a vehicle, such as, e.g., a motorcycle, ATV, car, truck, or the like. For example, the measuring device 30 may be positioned at a rear axle, or upon the hub of the rear axle, and the clamp 20 may be attached to a rear fender 12 or other suitable location. In a preferred embodiment a magnet 39 may be used to attach the device 30 to a hub or other metallic component. Cord 52 is extended from the housing 32 until the eye 53 is connected to the hook 23 of the clamp 20. At this point, the operator can view the display and record an initial measurement reading. Alternatively, the operator can "zero out" the encoder reading so that any retraction of the cord will be indicated in as a change in linear distance equal to the suspension sag without requiring the operator to calculate a difference between initial and final measurement readings. While it has been described as the cord having the eye and the clamp having the hook, it is to be understood by those skilled in the art that the eye and hook may be swapped. It is to be further understood that, although described as an eye and hook arrangement, any suitable releasable engagement mechanism may be employed between the cord and the clamp. Such other suitable engagement mechanisms include, but are not necessarily limited to, hook-and-loop fasteners, snaps, clips, magnets and the like.

After the cord has been affixed to the clamp, a load, such as, e.g., a rider/operator, may mount the vehicle. This load will cause a portion of the vehicle, such as, e.g., the rear suspension, to sag or lower. As the rear suspension sags, the fender 12 moves closer to the hub 16, and therefore closer to measuring device 30. The spool shaft 55 takes up any slack in the cord 52. The sprocket wheel 58 associated with the spool shaft 55 rotates as the spool shaft rewinds the slack in the cord 20. Rotary encoder 56 measures the rotation of the sprocket wheel 58, and therefore the rotation of spool shaft 55. Encoder PCB converts this measured rotation into a linear length of cord, which corresponds to a distance traveled by the fender 12 under the load. The final linear length may be displayed on screen 34. In a preferred embodiment, the linear length is displayed for a certain length of time, e.g., 10 seconds, thereby enabling the rider to exit the vehicle and travel to measuring device 30. In this manner, the rider is able to remain seated on/in the vehicle in a normal riding condition while the sag measurement is being made and displayed without having to reposition the body to observe the measurement. This extended display time thus enables more accurate measurement readings. If the display was not "zeroed" before application of the load, the operator will need to calculate the difference between the initial (unloaded) reading and the final (loaded) reading to arrive at the correct magnitude of linear travel caused by the suspension sag.

By way of example, and referring to FIG. 1, the clamp is mounted to the fender generally vertical of the measuring device. The cord is then mounted to the clamp after withdrawing the cord from the measurement device a distance equal to A, for instance 200 mm as determined by the encoder as described above. Loading of the rider in a normal seated position causes the rear suspension to sag such that the rear fender moves closer to the rear wheel hub. As the suspension sags, the cord is retracted by the measuring device such that the amount of rotation of the spool shaft required to retract the slack in the cord is measured by the encoder. The encoder translates the rotational information to a final linear distance B, for instance 80 mm. Thus, the amount of sag in the suspension is the difference between distance A and distance B, or distance C. In the above example, the amount of sag would equal 120 mm (200 mm−80 mm=120 mm).

Linear lengths may be additionally or alternatively sent over cable 54 to optional display unit 40 and shown on its associated screen 44 (see FIG. 1). In a further embodiment, communication with an optional display unit 40 may be conducted wirelessly as described above. The optional alternative display allows the rider to view measurements from any remote location (any location other than at the wheel hub where the measuring device is mounted), such as while the rider is still seated on the vehicle in a normal riding position. In a further embodiment, linear lengths may be communication to an optional display unit using wireless technology, such as WIFI or Bluetooth thereby eliminating the need for cable 54.

While in the embodiment described above, measuring device 30 is attached to the hub of the vehicle and clamp 20 is mounted to the body's fender. It is understood however that device 30 may be attached to the body and clamp 20 may be attached to the hub.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

What is claimed is:

1. A system for indicating motorcycle suspension sag while a rider is mounted on a motorcycle in a normal riding position wherein said suspension sag is indicated while the rider is mounted on the motorcycle in said normal riding position, the motorcycle having a sprung mass component and an unsprung mass component, the system comprising:
    a measuring device configured to attach to one of said sprung mass component or said unsprung mass component, the measuring device comprising:
        a housing;
        a spool shaft rotatably connected to said housing;
        a cord wound about said spool shaft, said cord having a free end, said free end being extendable relative to said housing between a first extended position and a second non-extended position, wherein said free end is connectable to the other one of said sprung mass component or said unsprung mass component;
        an encoder configured to measure a linear travel of the free end of said cord between said first extended position and said second non-extended position; and
        a display for displaying said indicated motorcycle suspension sag when said free end is in said second non-extended position and while the rider is mounted on the motorcycle in said normal riding position.

2. The system in accordance with claim 1 wherein said encoder is configured to measure a rotation of the spool shaft and wherein the linear travel of the free end of the cord is measured by the encoder and indicated by the measuring device.

3. The system in accordance with claim 2 further comprising a sprocket wheel having a multitude of teeth carried on the spool shaft wherein the encoder records the number of teeth as the spool shaft rotates.

4. The system in accordance with claim 1 wherein the encoder comprises at least one magnetic encoder.

5. The system in accordance with claim 1 wherein the measuring device includes a screen configured to display the linear travel of the free end of the cord.

6. The system in accordance with claim 5 wherein said screen is disposed remote from said housing.

7. The system in accordance with claim 1 wherein the encoder comprises at least one optical encoder.

8. A method for indicating motorcycle suspension sag while a rider is mounted on a motorcycle in a normal riding position wherein said suspension sag is indicated while the rider is mounted on the motorcycle in said normal riding position, the motorcycle having a sprung mass component and an unsprung mass component, the method comprising the steps of:
    a. providing a measuring device configured to attach to one of said sprung mass component or said unsprung mass component, wherein said measuring device comprises a housing; a spool shaft rotatably connected to said housing; a cord wound about said spool shaft, said cord having a free end, said free end being extendable relative to said housing between a first extended position and a second non-extended position, wherein said free end is connectable to the other one of said sprung mass component or said unsprung mass component; an encoder configured to measure a linear travel of said free end of said cord between said first extended position and said second non-extended position of said cord; and a display for displaying said indicated motorcycle suspension sag when said free end is in said second non-extended position;
    b. attaching said measuring device to one of said sprung mass component or said unsprung mass component;
    c. attaching said free end of said cord to the other of said sprung mass component or said unsprung mass component wherein said free end of said cord is at a first extended position relative to said housing;
    d. mounting a rider on the motorcycle in a normal seated position wherein said spool shaft retracts the free end of said cord to said second non-extended position;
    e. determining a linear distance traveled between said first extended position of said free end and said second non-extended position of said free end; and
    f. displaying said determined linear distance while the rider is mounted on the motorcycle in said normal riding position, wherein said determined linear distance corresponds to said motorcycle suspension sag.

* * * * *